Nov. 12, 1929.    R. STANLEY    1,735,550
SEED HULLER
Filed May 16, 1928    3 Sheets-Sheet 2

ROBERT STANLEY INVENTOR

BY Merrill M. Blackburn
ATTORNEY

Nov. 12, 1929.  R. STANLEY  1,735,550
SEED HULLER
Filed May 16, 1928   3 Sheets-Sheet 3

ROBERT STANLEY
INVENTOR

BY Merrill M. Blackburn
ATTORNEY

Patented Nov. 12, 1929

1,735,550

UNITED STATES PATENT OFFICE

ROBERT STANLEY, OF DE WITT, IOWA

SEED HULLER

Application filed May 16, 1928. Serial No. 278,178.

The present invention relates to a seed huller, the same being designed for the hulling of such grains as oats, barley, rice, corn, and various seeds such as sweet clover.

Among the objects of my invention are to improve upon present machines designed to perform similar functions; to provide a machine capable of hulling an increased volume of seed or grain in a given time; to provide a machine of the character indicated which is more efficient for the purpose indicated than are existing machines; to provide a machine which is durable in construction but yet is capable of being constructed inexpensively; and such further objects, advantages and capabilities as will hereinafter appear and as are inherent in the construction disclosed herein. My invention further resides in the combination, construction and arrangement of parts illustrated in the accompanying drawings and, while I have shown therein what is now considered the preferred embodiment of this invention, I desire the same to be understood as illustrative only and not as limiting the invention.

Figure 1:
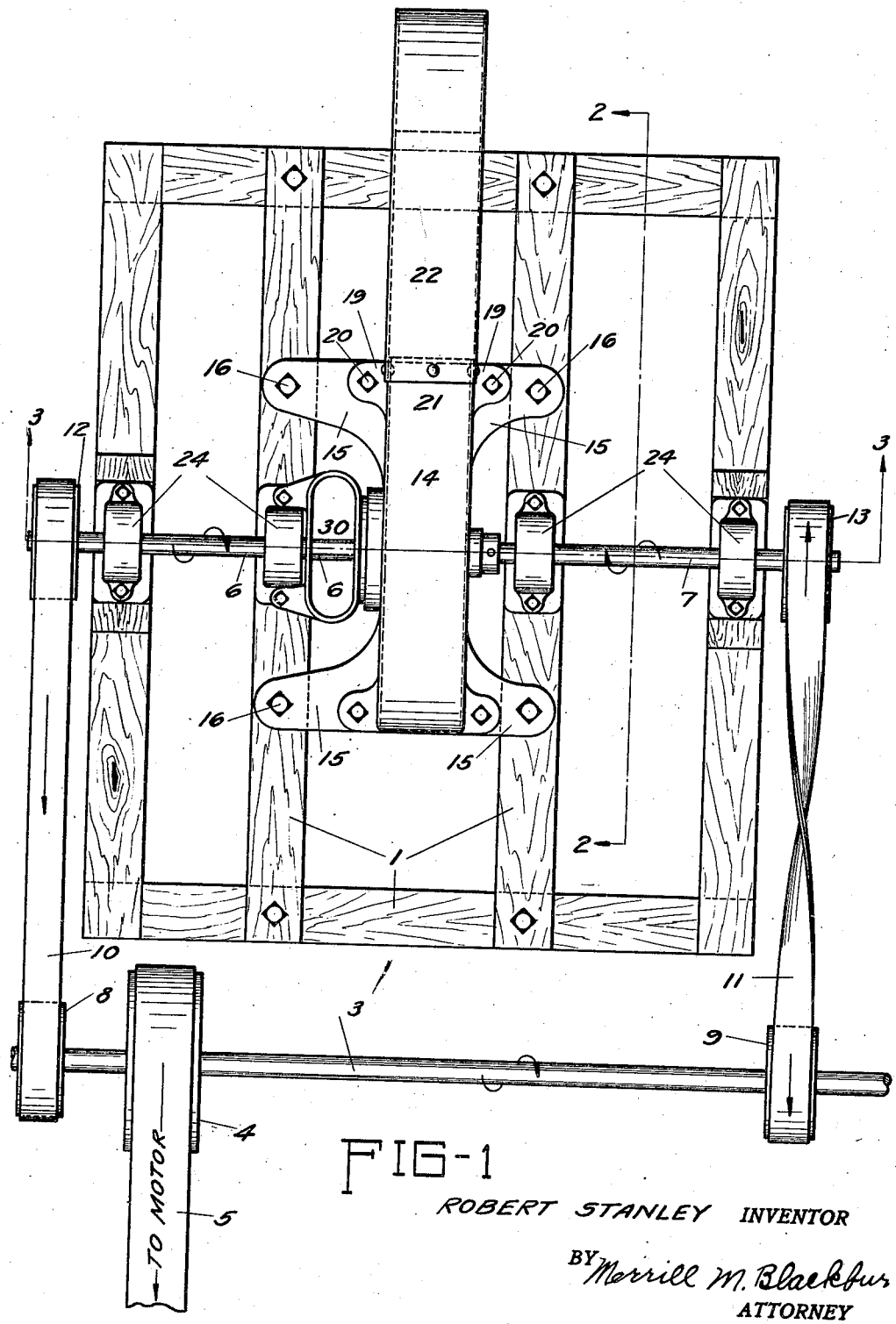
Figure 2:
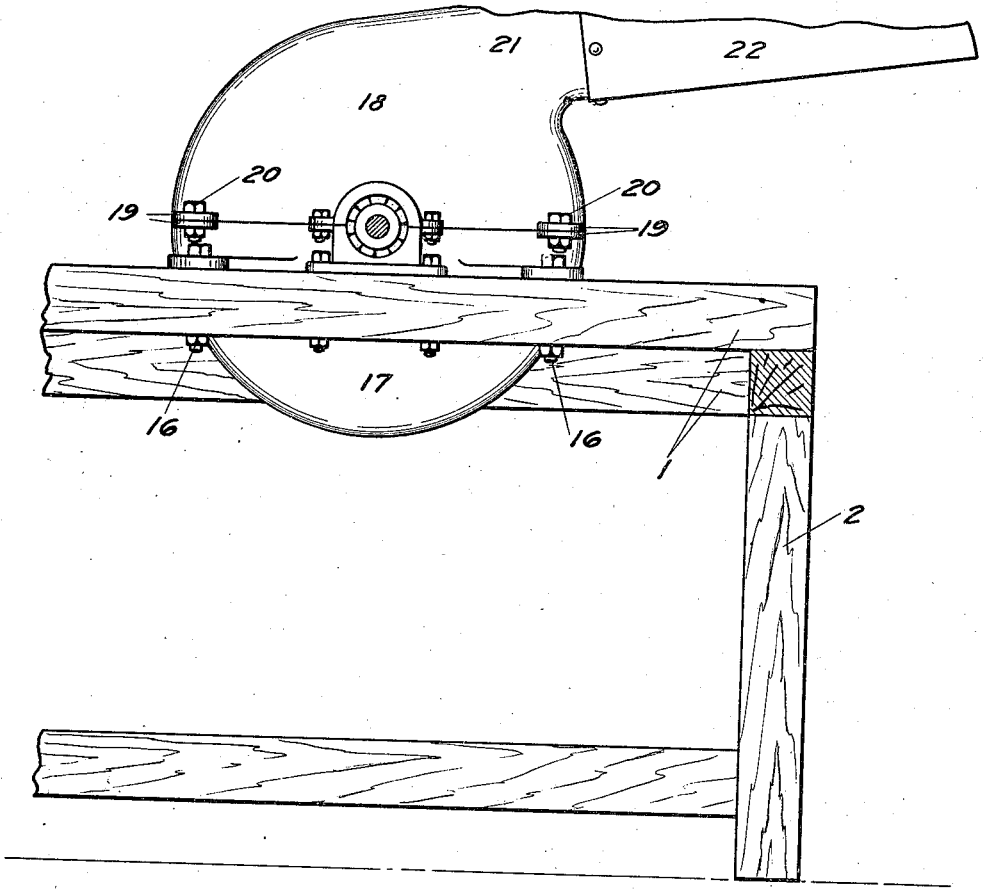
Figure 3:
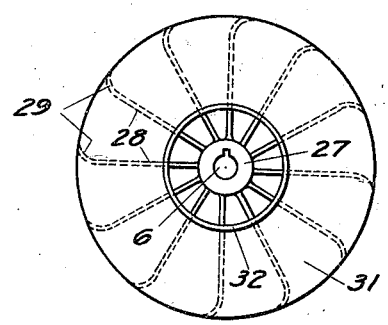
Figure 3:
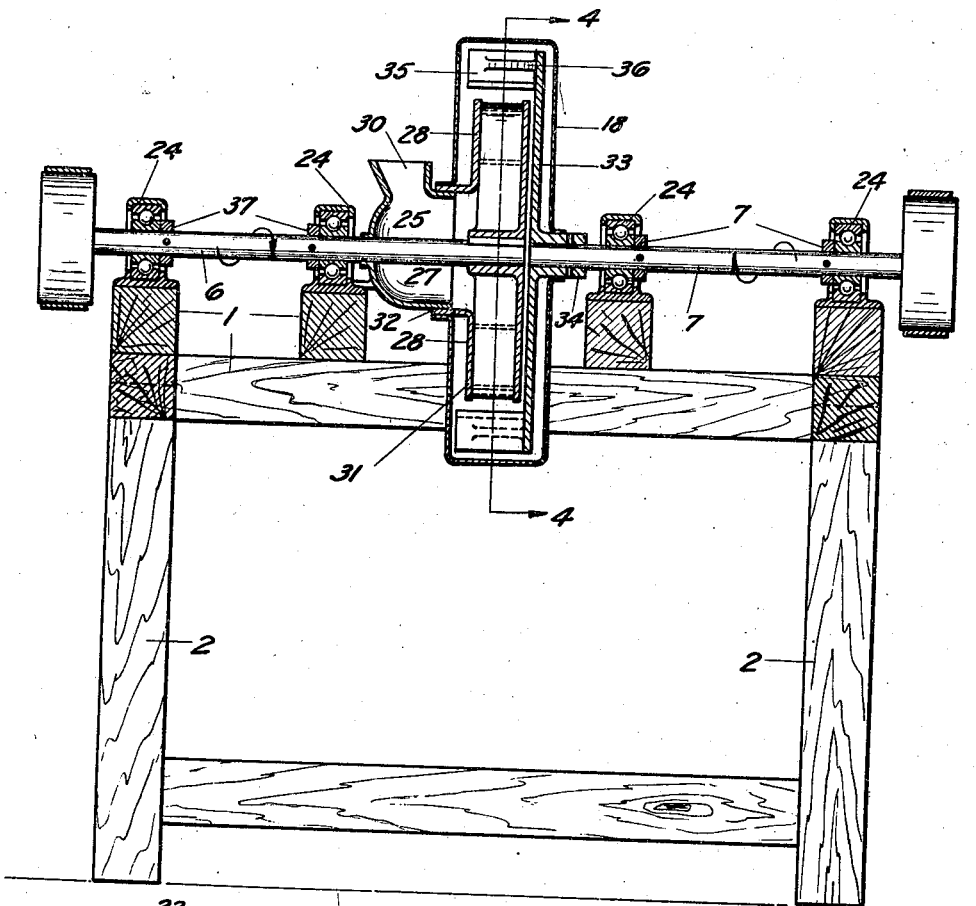
Figure 4:
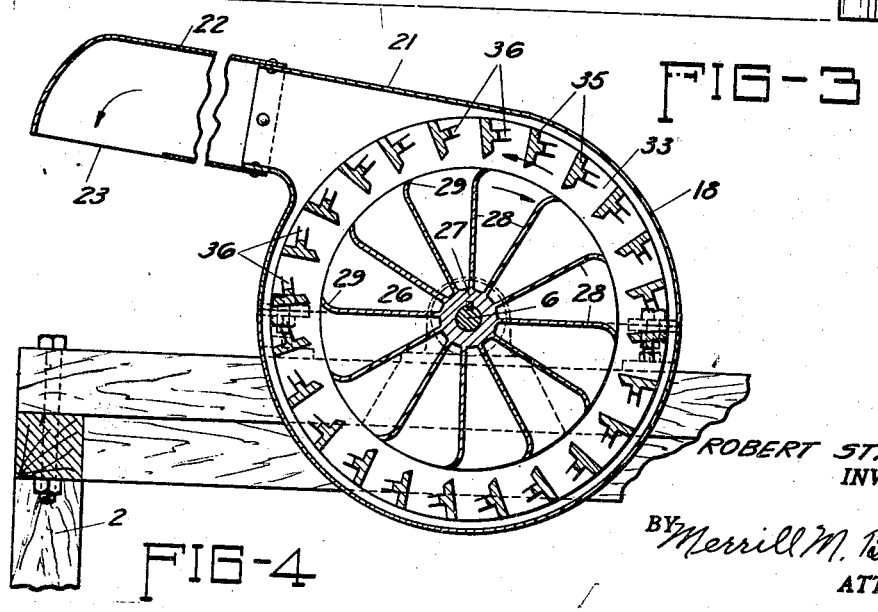

In the drawings attached hereto and forming a part hereof, Fig. 1 is a plan view of my improved huller; Fig. 2 is a sectional elevation substantially along the plane indicated by the line 2—2, Fig. 1; Fig. 3 is a transverse sectional elevation substantially along the plane indicated by the lines 3—3, Fig. 1; Fig. 4 is a fragmentary sectional elevation substantially along the plane indicated by the line 4—4, Fig. 3; Fig. 5 is an elevation of the huller element detached from the casing and outer rotating element.

Referring more in detail to these drawings, numeral 1 denotes suitable framework having supporting legs 2 and having associated therewith a shaft 3, which is preferably carried by brackets mounted on the framework, though these brackets are not shown in the drawings. Preferably a belt pulley 4 is mounted on shaft 3 and has a belt 5 connected therewith for the driving of the huller, the belt passing to any suitable motive means, such as an electric motor or a driving means actuated by steam. However, it will be understood that any suitable motive means may be used to drive the shafts of the huller. It is preferred to drive these shafts 6 and 7 in a manner shown in Fig. 1 wherein a pair of belt wheels 8 and 9 are shown as mounted upon the shaft 3 and have belts 12 and 13 passing thereover and over the belt wheels which are mounted upon the shafts 6 and 7. As shown in Fig. 1, belt 11 is twisted so that the shafts 6 and 7 will rotate in opposite directions. Any suitable means may be provided for accomplishing this purpose.

A case 14 having laterally extending lugs 15 is mounted on the frame 1 by having bolts 16 passing through the lugs 15 and the frame members. This casing 14 has a lower section 17 and an upper section 18, each carrying lugs 19 through which pass bolts 20 to secure the parts together. The casing 18 has a tangential delivery nozzle extending from one side thereof, out of which the seed is forced by the operation of the huller. A hood 22 having a downwardly directed opening 23 is secured to the end of the delivery nozzle 21. Of course it will be apparent that this extension could be formed integrally with the delivery nozzle, if desired, but it is preferred to construct this part of the machine as shown in Fig. 4, the parts being secured together in any suitable manner as by rivets or spot welding.

Anti-friction bearings 24, such as ball or roller bearings are mounted upon the framework 1 and carry the shafts 6 and 7. The shaft 6, as shown in Fig. 3, passes through a wall of the feed hopper 25 and carries upon its inner end the inner rotating element 26 comprising a hub 27 and vanes 28. These latter have their outer ends turned forwardly as indicated at 29 so that grain being delivered by them will have its direction changed so as to strike the faces of the blades of the outer rotating element at more nearly a right angle than if these ends were not curved but extended radially outward. The feed hopper 25 has a receiving opening 30 into which any suitable delivery hopper may discharge. It will thus be seen that when grain is put into the delivery hopper it will be fed to the hopper 25 and from this into the huller to be acted upon thereby. A cover plate 31 for the blades 28 is formed with a substantially cylindrical flange 32 into which the hopper 25 is inserted. The two fit closely but turn relatively to each other with ease. Of course, if it is desired, the cover plate 31 can be formed integral with the blades 28, though it is at present considered preferable to have this as a separate element secured to the body of this huller element 26.

A plate 33 has formed thereon a substantially central boss 34 which is axially perforated for the reception of the end of the shaft 7, the two being pinned or otherwise secured together. Preferably integrally formed with the plate 33 are comparatively narrow vanes 35, the same being arranged around the periphery of the plate 33 as shown in Figs. 3 and 4. These vanes 35 have reinforcing braces 36 to insure that the vanes will not readily be broken off in event some hard article like a stone should get into the machine. Attention is called to the fact that the impact faces of the vanes 35 are not radial with respect to the shafts 6 and 7 and the hubs 27 and 34 but are set at such an angle that the grain delivered by the inner rotating element will strike the faces of these vanes 35 at nearly a right angle. This results in a harder blow being delivered with the consequent more complete removal of the hulls. Since the shafts 6 and 7 are preferably run at a speed of 900 to 1,000 R. P. M. it will be seen that the force of impact is quite considerable. As the outer rotating element is traveling at a considerable speed, the air and hulled grain are forced outwardly through the hood 22 and the suction created through the hopper 25 tends to draw the grain into the inner element 26. Collars 37, held in place by suitable means such as set screws, are provided to hold the shafts 6 and 7 in adjusted positions and to permit relative adjustment thereof so as to secure a proper relationship of these parts within the casing 18. The inner edges of the vanes 35 are not perpendicular to the lateral faces but are bevelled off so that their planes lie substantially in the direction which the grain travels in moving toward the vanes 35. This reduces to a minimum the number of imperfect impacts of the grains upon the blades or vanes.

Various modifications of the structure disclosed have been contemplated. For example, the shafts 6 and 7 may be replaced by a solid shaft and a hollow shaft, the latter surrounding the former and serving as supporting means therefor. Each would be supplied with a gear or pulley for the application of power. However, this method of construction was not found as satisfactory as the one disclosed herein. Another method of applying the power to the rotating elements is to omit the shafts and apply gears or pulleys to the flange 32 and boss 34 but this construction is not considered satisfactory.

It is of course understood that the specific description of structure set forth above may be departed from without departing from the spirit of my invention as set forth in this specification and the appended claims.

Having now described my invention, I claim:

1. A seed huller comprising a casing for the reception of the seed to be hulled, and a pair of hulling members mounted therein and rotatable in opposite directions, said hulling members each comprising a supporting member having a plurality of vanes thereon to engage the seed.

2. In a huller, a substantially cylindrical casing having a substantially tangentially arranged discharging spout connected to the periphery thereof, an inlet to admit seeds or grains approximately centrally of an end of the casing, a pair of oppositely rotating supporting members in the casing having seed engaging members thereon to catch and throw the seeds outwardly, the seed engaging members of one supporting member being arranged radially outwardly from those on the other member.

3. In a huller, a substantially cylindrical casing having a substantially tangentially arranged discharging spout connected to the periphery thereof, said spout having a downwardly directed discharging opening, an inlet to admit seeds or grains approximately centrally of an end of the casing, a pair of oppositely rotating supporting members in the casing having seed engaging members thereon to catch and throw the seeds outwardly, the seed engaging members of one supporting member being arranged radially outwardly from those on the other member, the seed engaging members on one supporting member having their outer ends turned forwardly in the direction of rotation of said member so as to direct the seeds substantially perpendicularly against the faces of the other seed engaging members.

4. In a machine of the character described, a casing, rotating members therein, said members having vanes thereon, the vanes of one member rotating in a circle outside of the vanes of the other member and in the same plane, the outer ends of the inner vanes being curved forwardly in the direction of rotation thereof.

5. In a machine of the character described, a casing, rotating members therein, said members having vanes thereon, the vanes of one member rotating in a circle outside of the vanes of the other member and in the same plane, the inner set of vanes having their ends turned forwardly in the direction of rotation of said member so that the particles thrown off thereby will be directed against the outer vanes at nearly a right angle.

6. In a machine of the character described, a casing, rotating members therein, said members having vanes thereon, the vanes of one member rotating in a circle outside of the vanes of the other member and in the same plane, the outer set of vanes having their impact faces inclined toward the inner set of vanes so that the seeds thrown off by the inner vanes may strike them substantially at a right angle and the inner vanes having their outer extremities curved forwardly to give the seeds a forward directional discharge.

7. In an impact huller, a casing, a central rotating shaft therein, a hub secured to the shaft, substantially flat vanes extending substantially radially from said hub in planes longitudinal thereof, the shaft, hub and vanes being designed to rotate in one direction only and the vanes having their outer extremities bent forwardly in the direction of rotation of the shaft.

In witness whereof, I hereunto subscribe my name to this specification.

ROBERT STANLEY.